United States Patent Office 2,825,727
Patented Mar. 4, 1958

2,825,727

UNGELATINIZED STARCH PRODUCTS OF IMPROVED PROPERTIES AND METHOD OF MAKING THE SAME

Carlyle G. Caldwell, North Plainfield, N. J., assignor to National Starch Products Inc., New York, N. Y., a corporation of Delaware No Drawing. Application May 19, 1954
Serial No. 430,983

20 Claims. (Cl. 260—233.3)

This invention is a continuation-in-part of my co-pending U. S. application Serial No. 756,106, filed June 20, 1947.

My invention relates to the production of starch products of improved properties. More specifically, it relates to the treatment of starches whereby they attain greater stability and clarity of the cooked pastes, greater resistance to gelling of the pastes upon cooling, and lowered gelatinization point, as compared to the corresponding untreated starch material.

The improved properties set forth above are of particular importance in the manufacture of adhesives, the use of starch as a thickening agent in foods and the sizing and fabrication of certain types of textiles and papers. Of particular significance from the standpoint of industrial utilization is the fact that such starches, when cooked in the presence of acids or salts, show less loss of their viscosity and clarity than do the corresponding untreated starches.

It is the prime object of the present invention to produce starch derivatives having the above properties and to devise a method for the ready production of said products. Other objects will become apparent from the ensuing specification.

In this specification the term "starch" includes starch from any source, such as corn, wheat, potato, tapioca, waxy maize, sago, sweet potato and the like, and also starches which have been converted, either by acid hydrolysis, oxidation or other means.

I have discovered that starch derivatives of these and other improved properties of commercial importance may be formed by the production of starch derivatives containing sulfonic acid groups. This production can be effected either by reacting raw starch with suitable reagents or by reacting certain unsaturated, ungelatinized starch derivatives with a chemical containing the sulfonic acid group, such as a bisulfite. In either event, the improved starch derivative of the present invention is characterized by containing a sulfonic acid group.

When unsaturated starch derivatives are employed, it is desirable that the starch unsaturation be caused by an ethylenic double bond as shown diagrammatically by the following formula:

$$(C_6H_{10}O_5)_x \cdot C_6H_9O_4\text{---}R\text{---}C=C\text{---}R_3$$
$$\phantom{xxxxxxxxxxxxxxxxxxxx}|\phantom{xx}|$$
$$\phantom{xxxxxxxxxxxxxxxxxxxx}R_1\phantom{x}R_2$$

wherein R may be

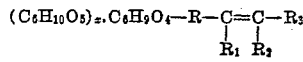

and wherein, if both $R_2$ and $R_3$ are hydrogen, $R_1$ must be a member of the first group consisting of formyl, cyano, carboxy, carbalkoxy and carbalkyl radicals, and if either $R_2$ or $R_3$ or both are members of the second group consisting of the first group and alkyl, aryl and substituted alkyl and aryl radicals, $R_1$ need not be a member of the first group. An example of the first type of derivative in which both $R_2$ and $R_3$ are hydrogen is the tapioca starch ester of itaconic acid (see Example VII). An example of the type of derivative in which both $R_2$ and $R_3$ are not hydrogen is the potato starch ester of citraconic acid (see Example III). Examples of the type of derivative in which only one of the radicals $R_2$ and $R_3$ are not hydrogen are the corn starch ester of maleic acid in which either $R_2$ or $R_3$ is a carboxy radical (see Example I) and the tapioca starch ester of crotonic acid in which either $R_2$ or $R_3$ is an alkyl radical (see Example II). In all of these examples, in which either $R_2$ or $R_3$ or both are not hydrogen, $R_1$ is hydrogen, but this is not essential to the carrying out of my invention. To put the matter in another way, if $R_1$ is not one of the radicals of the first group, but instead may be hydrogen, then either $R_2$ or $R_3$ or both must be a member of the second group.

It will be noted that I have excluded that type of unsaturated derivative in which $R_2$ and $R_3$ are hydrogen and $R_1$ is not a radical chosen from the first group. I have then found that the use of this latter type of unsaturated derivative produces a completely different type of product from that of my present invention, this product being described in U. S. Patent No. 2,668,156.

Various derivatives of starch may be reacted with bisulfite for the purposes of this invention. Among the suitable starch derivatives into which sulfonic acid groups may be introduced are, for example, certain of the starch esters prepared according to the method described in U. S. Patent No. 2,461,139. In accordance with that method, certain starch esters are made by treating starch in aqueous suspension with alkali and with anhydrides of organic acids containing double bonds, such as the anhydrides of maleic, citraconic, itaconic and crotonic acids. It is to be understood, however, that the practice of my invention is not limited to starch derivatives made by any particular method, the only limiting factor being that the starch derivatives treated must contain unsaturated radicals of the type described, the unsaturation being due to the presence of an ethylenic double bond.

The treatment of unsaturated starch derivatives with bisulfite, according to my invention, can be carried out in aqueous suspension, at temperatures below the gelatinization temperature of the starch or starch derivative. This makes it possible to filter and wash the resultant starch product—a fact of considerable importance in the industrial application of this process.

Although in dealing with complex reactions of the type under discussion, analysis of the molecular changes involved cannot be carried out with absolute precision, it is believed that the action of the bisulfite such as sodium bisulfite on the unsaturated starch derivative causes a saturation of the derivative by the attachment of the bisulfite group to one of the unsaturated carbon atoms on the chain. Thus, if the corn starch ester of maleic acid, which has the general form

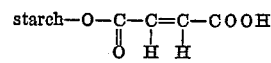

is appropriately reacted with sodium bisulfite, the resultant starch derivative will, it is believed, exhibit the molecular structure

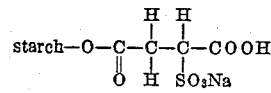

While the sulfonic acid group is here illustrated as being attached to the alpha carbon of the free carboxyl group, it might instead be attached to the beta carbon of the free carboxyl group. It is the starch derivative having the probable molecular form shown which exhibits the desired characteristics.

It should be noted that the various unsaturated starch derivatives which I employ as, for example, those made by the process of the above-listed Patent No. 2,461,139 have been so treated that the granule structure of the starch has not been destroyed, and the substitution of the hydroxyl groups has probably taken place on the surface of the granule. According to the process of my present invention, the unbroken granule of the starch is retained; in other words, the addition of the sulfonic acid groups probably takes place with unsaturated groups on the surface of the granule, and again, there is, therefore, a relatively low degree of substitution.

Although, as stated above, the bisulfite addition can take place in aqueous suspension, it has been found that the addition of the sulfonic acid group to the unsaturated radical also takes place readily if the unsaturated starch derivative is refluxed in ethanol or other non-aqueous media, in the presence of bisulfite. This is especially true of the treatment of the itaconic acid ester of starch with bisulfite. It is understood, of course, that starch will not gelatinize in the absence of substantial proportions of water, and therefore, this alcohol-refluxing method has the same advantages as the aqueous method, namely, it results in an ungelatinized, washable, filterable product.

As has already been set forth, it is possible to form an ungelatinized starch granule containing sulfonic acid groups, which granule corresponds to the molecular structure previously set forth, by utilizing raw starch (that is, starch which does not contain the unsaturated radicals). This ungelatinized raw starch is treated with alkali and with a compound which contains both a sulfonic acid group and a group capable of reacting with the hydroxyl groups in the starch to produce starch ethers or esters. Thus, there results an ether or ester derivative of starch which contains sulfonic acid groups. In order to cause substantial reaction of these acids with starch, it has been found that rather high concentrations of alkali are ordinarily advisable, and as will be seen from the examples hereinafter given, we use as much as 4.5% alkali based on the starch, although it is understood that the amount of alkali must be limited to that which will permit the said mentioned reaction with the hydroxyl groups in the starch. It has already been explained that gelatinization of the starch is to be avoided, and since this high alkali content would ordinarily cause gelatinization of the starch granules, it is advisable to suspend the starch in a concentrated sodium sulfate solution before addition of the alkali and the subsequent addition of the ether or ester-forming derivative. The sodium sulfate prevents gelatinization of the starch in the presence of the high alkali concentrations needed for this reaction. This anti-gelatinization effect is apparent even at temperatures up to 100° C. Of course, it is possible to use lower quantities of alkali so as to avoid gelatinization, making unnecessary the use of sodium sulfate, but a considerably lower degree of substitution results. Examples of reagents of this type which combine the functions of ether-formation and sulfonic acid addition are starch etherifying reagents having a sulfonic acid group or a salt thereof and also having either a halogen, epoxy or ethylenic group, such as chloromethylo-isethionic acid $$(ClCH_2CHOHCH_2SO_3H)$$

benzyl chloride para-sulfonic acid

a,b-unsaturated olefinic sulfonic acids such as vinyl sulfonic acid $(CH_2\!=\!CHSO_3H)$, 2,3-epoxy 1 propane sulfonic acid

3 chloro 2 hydroxy 1 propane sulfonic acid and salts of said acids; suitable esterification reagents include organic acid anhydrides containing a sulfonic acid group or a salt thereof, such as sulfobenzoic anhydride and sulfophthalic anhydride.

It will be seen that I have indicated here the production of two types of starch derivatives containing sulfonic acid groups, i. e., starch esters and starch ethers. As compared to the starch esters, starch ethers and raw starch from which they are produced, the products of my invention are altered in the following respects:

(1) The cooked suspensions, or pastes, are clearer and more translucent.

(2) The cooked suspensions, or pastes, exhibit a lessened tendency to set to a gel upon cooling. This property, in a starch, of resistance to gelling of its cooked suspensions is known as "stability."

(3) The gelatinization temperature is lower.

(4) The clarity and viscosity of the cooked starch pastes are less sensitive to the presence of acids and salts; that is, they do not lose clarity and thin out in the presence of acids and salts to the extent that starch derivatives containing only carboxyl groups would do.

(5) In many cases they have increased water absorption. That is, they may be cooked with a larger quantity of water than the raw starch or the untreated starch ester or ether to produce a paste of a given viscosity. Products may also be prepared whose viscosity is unchanged, or even thinner, depending upon the desired ultimate application.

When I refer to treatment with bisulfite, it is understood that I mean sodium, potassium or ammonium bisulfite or any other acid salt of sulfurous acid.

The degree of improvement brought about by the process of my invention depends upon the following variables:

(1) The proportion of unsaturated radicals in the starch to be treated with bisulfite. The greater the proportion of unsaturated radicals present in the starch, the greater the amount of sulfonic acid groups which may thus be introduced into the starch. Excellent results have been obtained using starches containing from 1 unsaturated radical per 140 anhydroglucose units up to 1 unsaturated radical per 15 anhydroglucose units. In those cases where one reacts raw starch with a compound containing both a sulfonic acid group and a group capable of reacting with the hydroxyl groups in the starch, roughly the same range applies, namely, the introduction of from 1 sulfonic group per 140 anhydroglucose units in the starch to 1 sulfonic group per 15 anhydroglucose units.

(2) The proportion of bisulfite used, based on the unsaturated radicals in the starch. At room temperature, with about a four hour period of treatment, I prefer to use an amount of bisulfite equal to seven-fold the stoichiometrical amount calculated upon the weight of the unsaturated radical. At higher temperatures, say at 50° C., an equivalent result is obtained by using only about four times the stoichiometrical amount required by the weight of the unsaturated radical in the starch. On the other hand, far lower amounts of bisulfite can be used but with proportionately lesser degree of substitution.

(3) The period of treatment. A longer period of treatment permits decreased temperature and/or decreased amount of bisulfite.

(4) Temperature. The temperature of the reaction affects the other variables. At higher temperatures, the other variables may be decreased. As is common with many chemical reactions, the factors of the quantity of reagent, temperature and period of reaction are interrelated, i. e., the temperature is inversely proportional to the amount of reagent and the period of reaction is inversely proportional to the temperature and amount of reagent. Referring to increased temperatures, it should be remembered that at temperatures above 50° C. there will be the problem, in aqueous media, of gelatinization of the starch; this, however, can be overcome by carrying out the reaction in a saturated sodium sulfate solution, as previously described.

The following examples will further illustrate the embodiment of my invention.

Example I

This example illustrates the treatment of a corn starch ester of maleic acid with sodium bisulfite.

100 parts of corn starch ester of maleic acid

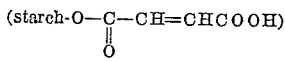

containing approximately 1 maleic acid ester radical per 28 anhydroglucose units is suspended in 200 parts of water in which is dissolved 15 parts of sodium bisulfite. The mixture is stirred for 4 hours at room temperature. The starch product is then filtered and washed. The resultant product has the improved properties previously described, namely, increased water absorption, greater clarity, lessened tendency of the cooked paste to gel upon cooling, lowered gelatinization temperature, and less sensitivity to acids and salts—all as compared to the starch ester prior to introduction of the sulfonic acid groups.

Example II

This example illustrates the treatment of a tapioca starch ester of crotonic acid with potassium bisulfite.

100 parts of tapioca starch ester of crotonic acid

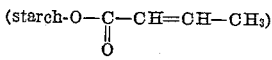

containing 1 crotonic ester radical per 26 anhydroglucose units is suspended in 200 parts of water in which is dissolved 8 parts of potassium bisulfite. The suspension of starch is stirred for three hours, maintaining the temperature at 50° C. The starch is then filtered and washed. The resultant product exhibits the improved properties described in Example I.

Example III

This example illustrates the treatment of potato starch ester of citraconic acid with ammonium bisulfite.

100 parts of potato starch ester of citraconic acid

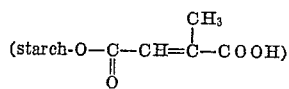

containing 1 citraconic acid ester radical per 19 anhydroglucose units is suspended in 200 parts of water in which is dissolved 25 parts of ammonium bisulfite. After stirring the suspension for 6 hours at room temperature, the starch is filtered and washed. The improved properties described in Example I are also noted in this product.

Example IV

This example illustrates the treatment of an unmodified starch wherein the unmodified starch is reacted with a compound which contains the sulfonic group.

100 parts of unmodified corn starch is suspended in 200 parts of water in which has been dissolved 3.5 parts of caustic soda and 75 parts of sodium sulfate. There is then added 5.0 parts of sodium benzyl chloride para sulfonate. The mixture is stirred and heated at 60° C. for 4½ hours. The alkali is then neutralized with acid and the starch is filtered and washed, resulting in the improved product previously described.

Example V

This example, like the previous one, illustrates the treatment of an unmodified starch.

100 parts of unmodified corn starch is suspended in 200 parts of water in which has been dissolved 4.5 parts of sodium hydroxide and 75 parts of sodium sulfate. There is then added 5 parts of sodium chloromethyloisethionate ($Cl-CH_2CHOH-CH_2SO_3Na$). The mixture is stirred at room temperature for 17 hours. The alkali is then neutralized with acid and the starch filtered and washed. This product also exhibits the improved properties previously noted.

Example VI

This example illustrates the treatment of a corn starch ester of maleic acid with sodium bisulfite. It differs from Example I in that a starch derivative is used which contains a greater proportion of maleic acid ester radicals and uses a larger proportion of bisulfite.

100 parts of corn starch ester of maleic acid containing 1 maleic acid ester radical per 15 anhydroglucose units is suspended in 200 parts of water in which is dissolved 25 parts of sodium bisulfite and 75 parts of sodium sulfate. The mixture is stirred for 4 hours, maintaining the temperature at 75° C. The starch is then filtered and washed. The sodium sulfate is used in this example because the elevated temperature would otherwise cause gelatinization of the starch.

Example VII

This example illustrates the treatment of a starch derivative with bisulfite-alcohol suspension rather than in an aqueous medium. 100 parts of tapioca starch ester of itaconic acid

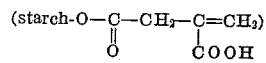

containing 1 itaconic ester radical per 26 anhydroglucose units is suspended in 300 parts of ethyl alcohol, containing dispersed therein 5 parts of sodium bisulfite. The mixture is refluxed for 4 hours. The starch product is then filtered and washed in the usual manner, exhibiting the improved properties previously described.

Example VIII

This example illustrates the etherification of starch with sodium-3-chloro-2-hydroxy-1-propanesulfonate.

80 parts of anhydrous sodium sulfate and 8 parts of sodium hydroxide are dissolved in 250 parts of water. 200 parts of corn starch are then suspended in this solution, with agitation, followed by the addition of 8 parts of sodium 3-chloro-2-hydroxy-1-propanesulfonate.

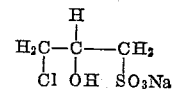

The suspension is agitated for 16 hours, then neutralized to a pH of approximately 6, filtered, washed and dried. The resulting product, when cooked in water, results in a sol which has a much higher viscosity when hot and which is much more stable to viscosity change when cold, as compared to the corresponding untreated starch.

Example IX

This example illustrates the esterification of starch with sulfobenzoic anhydride.

100 parts of corn starch are suspended in 125 parts of water. The pH is adjusted to 9 with a 3% aqueous solution of sodium hydroxide.

There are then slowly added 5 parts of sulfobenzoic anhydride dissolved in 60 parts of acetone, maintaining the pH between 8.5 and 10.0 by additions of a 3% aqueous sodium hydroxide solution. After all of the sulfobenzoic anhydride has been added, the pH is neutralized to 6 and the starch is filtered, washed and dried. The resulting product, when cooked in water, is heavier and clearer than a sol made with the corresponding untreated starch, and after cooling it is more stable.

Example X

This example illustrates the esterification of starch with sulfophthalic anhydride.

200 parts of corn starch are suspended in 300 parts of water. The pH is adjusted to 10, with a 3% aqueous sodium hydroxide solution. There are then slowly added ¼ part portions of sulfophthalic anhydride, maintaining the pH between 7 and 10 by the addition of aqueous 3% sodium hydroxide solution. After 10 parts of sulfophthalic anhydride have been added, agitation is continued for one hour, with the pH at approximately 8. The material is then neutralized to pH 6, and the starch is filtered, washed and dried. The resulting product gelatinizes in water much more readily than untreated corn starch, giving a product which is heavier when hot, and considerably more stable upon cooling.

Referring again to U. S. Patent No. 2,461,139, methods are there described whereby ungelatinized starches are treated in water suspension with alkali and certain organic acid anhydrides at a pH within the range 7 to 11. The improved properties of the starch so treated, as compared to the raw, untreated starch, are similar, although to a lesser degree, to the improved qualities obtained in my present process. In other words, the starch esters produced by the organic acid anhydride treatment of the above mentioned patent exhibit the properties of increased water absorption, greater clarity, and stability, as compared to the untreated starch. The starch products now produced by the present method of introducing sulfonic groups into the starch molecule exhibit a further improvement in these same qualities of clarity, stability, and frequently water absorption, as previously described.

In the above-mentioned patent, the effect of the organic acid anhydrides upon the starch properties was attributed to the fact that starch ester derivatives were formed, in which one carboxyl group of the dicarboxylic acid was esterified with a hydroxyl group of the starch molecule, whereas one carboxyl group remained unesterified. This free, or unesterified, carboxyl group or its alkali metal salt is believed to have a very great affinity for water, thus accounting for the fact that the starches so treated exhibit greater clarity, and often absorb greater quantities of water when cooked, as compared to the untreated starches. It was also suggested that the esters formed with the hydroxyl groups in the amylose, or linear fraction of the starch, could be considered as taking the form of side groups or branches, thus preventing the linear amylose molecules from becoming oriented in a closely parallel fashion with each other and with the linear portions of the amylopectin or branched molecule fraction of the starch, and thereby resulting in the prevention of association of the starch molecules through hydrogen bonding between the hydroxyl groups. In this manner the retrogradation or setting of the starch to a gel is prevented.

With reference to my present invention wherein sulfonic acid groups are introduced into the starch molecule, it is believed that the further improved properties are due to the fact that sulfonic acid groups are, in general, more acidic (that is, more highly dissociated) than carboxylic acid groups and, in consequence, have even greater affinity for water than do the carboxyl groups.

The characteristics of controlled water absorption, greater clarity and greater resistance to gelling as well as lowered gelatinization temperature point to obvious commercial and industrial uses for the product of my invention. It is of value in adhesives and also as a thickening agent in foods and other manufactures. Also of particular significance is the resistance of the product of my invention to break down upon cooking in the presence of acids or salts. The manufacture of food preparations such as salad dressings, pie fillings and the like frequently involves cooking of starch or starch derivatives in the presence of acids and/or salts and, as stated, the starch of my invention shows substantially less tendency to loss of viscosity and clarity under such conditions, as compared to the corresponding untreated starches. It is, of course, understood that before using any particular starch derivative in foods, its non-toxicity must first be investigated and fully established.

These same improved qualities give the products of my invention great value in textile and paper sizing and fabrication. It is adaptable to the manufacture of paper beater sizes because of the increased retention of the starch in the paper fibers. The characteristic of lowered gelatinization temperatures is of particular interest in the preparation of starches requiring lower temperatures for cooking and shorter cooking times.

I claim:

1. An ungelatinized starch derivative selected from the class consisting of: (a) the reaction product of raw starch with starch etherifying reagents having a sulfonic acid group and salts thereof and also having a group from the class consisting of halogen, epoxy and ethylenic groups under reaction conditions such that gelatinization will not take place and under such limited alkalinity conditions that the etherifying agent reacts with hydroxyl groups of the starch, said reaction product containing from one sulfonic group per 140 anhydroglucose units in the starch to one sulfonic group per 15 anhydroglucose units; (b) the reaction product of raw starch with starch esterifying reagents comprising organic acid anhydrides containing a sulfonic acid group and salts thereof, under reaction conditions such that gelatinization will not take place, and (c) the reaction product of a member selected from the class consisting of sulfurous acid and the acid salts of sulfurous acid with an unsaturated starch derivative having an ethylenic double bond of the type $$(C_6H_{10}O_5)_x \cdot C_6H_9O_4-R-C=C-R_3$$
$$\qquad\qquad\qquad\qquad\quad |\ \ \ |$$
$$\qquad\qquad\qquad\qquad\quad R_1\ R_2$$

in which R is a member selected from the class consisting of

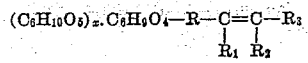

and in which, if both $R_2$ and $R_3$ are hydrogen, $R_1$ must be a member selected from the first class consisting of formyl, cyano, carboxy, carbalkoxy and carbalkyl radicals and in which, if either $R_2$ or $R_3$ or both are members of the second class consisting of formyl, cyano, carboxy, alkyl, aryl and substituted alkyl and aryl radicals, then $R_1$ must be a member selected from the class consisting of hydrogen and the radicals of the second class, the said ungelatinized starch derivative being characterized by retaining the unbroken granular structure of the raw starch.

2. A starch derivative comprising the reaction product of a member selected from the class consisting of sulfurous acid and the acid salts of sulfurous acid with an unsaturated starch ester having an ethylenic double bond of the type $$(C_6H_{10}O_5)_x \cdot C_6H_9O_4-R-C=C-R_3$$
$$\qquad\qquad\qquad\qquad\quad |\ \ \ |$$
$$\qquad\qquad\qquad\qquad\quad R_1\ R_2$$

in which R is

and in which, if both $R_2$ and $R_3$ are hydrogen, $R_1$ must be a member selected from the first class consisting of formyl, cyano, carboxy, carbalkoxy and carbalkyl radicals, and in which, if either $R_1$ or $R_2$ or both are members selected from the second class consisting of formyl, cyano, carboxy, alkyl, aryl and substituted alkyl and aryl radicals, then $R_1$ must be a member selected from the class consisting of hydrogen and the radicals of the second class.

3. A starch derivative comprising the reaction product of a member selected from the class consisting of sulfurous acid and the acid salts of sulfurous acid with an unsaturated starch ester having an ethylenic double bond of the type $$(C_6H_{10}O_5)_x \cdot C_6H_9O_4-R-C=C-R_3$$
$$\qquad\qquad\qquad\qquad\quad |\ \ \ |$$
$$\qquad\qquad\qquad\qquad\quad R_1\ R_2$$

in which R is

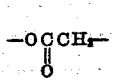

and in which, if both $R_2$ and $R_3$ are hydrogen, $R_1$ must be a member selected from the first class consisting of formyl, cyano, carboxy, carbalkoxy and carbalkyl radicals, and in which, if either $R_2$ or $R_3$ or both are members selected from the second class consisting of formyl, cyano, carboxy, alkyl, aryl and substituted alkyl and aryl radicals, then $R_1$ must be a member selected from the class consisting of hydrogen and the radicals of the second class.

4. An ungelatinized starch derivative comprising the reaction product of raw starch with an etherifying agent comprising sodium chloromethylo-isethionate under reaction conditions such that gelatinization will not take place and under such limited alkalinity conditions that the etherifying agent reacts with hydroxyl groups of the starch, said reaction product containing from one sulfonic group per 140 anhydroglucose units in the starch to one sulfonic group per 15 anhydroglucose units.

5. An ungelatinized starch derivative comprising the reaction product of raw starch with an etherifying agent comprising sodium-3-chloro-2-hydroxy-1 - propanesulfate under reaction conditions such that gelatinization will not take place, and under such limited alkalinity conditions that the etherifying agent reacts with hydroxyl groups of the starch, said reaction product containing from one sulfonic group per 140 anhydroglucose units in the starch to one sulfonic group per 15 anhydroglucose units.

6. An ungelatinized starch derivative comprising the reaction product of raw starch with an etherifying agent comprising vinyl sulfonic acid, under reaction conditions such that gelatinization will not take place, and under such limited alkalinity conditions that the etherifying agent reacts with hydroxyl groups of the starch, said reaction product containing from one sulfonic group per 140 anhydroglucose units in the starch to one sulfonic group per 15 anhydroglucose units.

7. An ungelatinized starch derivative comprising the reaction product of a member of the class consisting of sulfurous acid and the acid salts of a sulfurous acid with a starch ester of maleic acid under reaction conditions preventing gelatinization from taking place, the said ungelatinized starch derivative being characterized by retaining the unbroken granular structure of raw starch.

8. An ungelatinized starch derivative comprising the reaction product of a member of the class consisting of sulfurous acid and the acid salts of a sulfurous acid with a starch ester of crotonic acid under reaction conditions such that gelatinization will not take place.

9. A method of lowering the gelatinization point and improving the stability of an ungelatinized, unsaturated starch derivative having an ethylenic double bond of the form

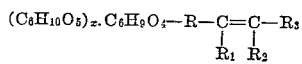

in which R is a member selected from the class consisting of

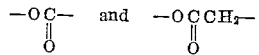

and in which, if both $R_2$ and $R_3$ are hydrogen, $R_1$ must be a member selected from the first class consisting of formyl, cyano, carboxy, carbalkoxy and carbalkyl radicals and in which, if either $R_2$ or $R_3$ or both are members selected from the second class consisting of formyl, cyano, carboxy, alkyl, aryl and substituted alkyl and aryl radicals, then $R_1$ must be a member selected from the class consisting of hydrogen and the radicals of the second class, which comprises reacting such an ungelatinized starch derivative with a member of the class consisting of sulfurous acid and the acid salts thereof.

10. The method of claim 9, in which the ungelatinized starch derivative is reacted with sodium bisulfite.

11. The method of claim 9, in which the ungelatinized starch derivative is reacted with potassium bisulfite.

12. The method of claim 9, in which the ungelatinized starch derivative is reacted with ammonium bisulfite.

13. The method of claim 9, in which the ungelatinized starch derivative is held in aqueous suspension.

14. The method of claim 9, in which the ungelatinized starch derivative is held in non-aqueous suspension.

15. The method of claim 9, in which the ungelatinized starch derivative is reacted in a medium of ethyl alcohol.

16. A method of lowering the gelatinization point and improving the stability of an ungelatinized, unsaturated starch derivative which comprises reacting raw starch with a member of the class consisting of (a) starch etherifying reagents having a sulfonic acid group and salts thereof and also having a group from the class consisting of halogen, epoxy and ethylenic groups, the reaction being under conditions such that gelatinization will not take place and under such limited alkalinity conditions that the etherifying agent reacts with hydroxyl groups of the starch, said reaction product containing from one sulfonic group per 140 anhydroglucose units in the starch to one sulfonic group per 15 anhydroglucose units, and (b) organic acid anhydrides containing a sulfonic acid group and salts thereof as starch esterifying reagents, in the presence of alkali under reaction conditions such that gelatinization will not take place.

17. A method of lowering the gelatinization point and improving the stability of an ungelatinized, unsaturated starch derivative which comprises reacting raw starch with an etherifying agent comprising sodium chloromethylo-isethionate in the presence of alkali under reaction conditions such that gelatinization will not take place, the reaction being under conditions such that gelatinization will not take place and under such limited alkalinity conditions that the etherifying agent reacts with hydroxyl groups of the starch, said reaction product containing from one sulfonic group per 140 anhydroglucose units in the starch to one sulfonic group per 15 anhydroglucose units.

18. A method of lowering the gelatinization point and improving the stability of an ungelatinized, unsaturated starch derivative which comprises reacting raw starch with an etherifying agent comprising sodium 3-chloro-2 hydroxy-1-propanesulfate in the presence of alkali under reaction conditions such that gelatinization will not take place, the reaction being under conditions such that gelatinization will not take place and under such limited alkalinity conditions that the etherifying agent reacts with hydroxyl groups of the starch, said reaction product containing from one sulfonic group per 140 anhydroglucose units in the starch to one sulfonic group per 15 anhydroglucose units.

19. A method of lowering the gelatinization point and improving the stability of an ungelatinized, unsaturated starch derivative which comprises reacting raw starch with an etherifying agent comprising vinyl sulfonic acid in the presence of alkali under reaction conditions such that gelatinization will not take place, the reaction being under conditions such that gelatinization will not take place and under such limited alkalinity conditions that the etherifying agent reacts with hydroxyl groups of the starch, said reaction product containing from one sulfonic group per 140 anhydroglucose units in the starch to one sulfonic group per 15 anhydroglucose units.

20. A method of lowering the gelatinization point and improving the stability of an ungelatinized, unsaturated starch derivative which comprises suspending raw starch in a concentrated sodium sulfate solution, adding alkali and then adding a starch etherifying reagent having a sulfonic acid group and salts thereof and also having a group from the class consisting of halogen, epoxy and ethylenic groups under reaction conditions such that gelatinization will not take place, and under such limited alkalinity conditions that the etherifying agent reacts with hydroxyl groups of the starch, said reaction product containing from one sulfonic group per 140 anhydroglucose units in the starch to one sulfonic group per 15 anhydroglucose units.

References Cited in the file of this patent

UNITED STATES PATENTS

| | | |
|---|---|---|
| 2,132,181 | Neugebauer et al. | Oct. 4, 1938 |
| 2,148,554 | Hentrich et al. | Feb. 28, 1939 |

FOREIGN PATENTS

| | | |
|---|---|---|
| 493,513 | Great Britain | Oct. 6, 1938 |

UNITED STATES PATENT OFFICE
Certificate of Correction

Patent No. 2,825,727                        March 4, 1958

Carlyle G. Caldwell

It is hereby certified that error appears in the printed specification of the above numbered patent requiring correction and that the said Letters Patent should read as corrected below.

Column 2, line 18, for "ond" read —and—; column 3, line 68, for "$(CH_2-CHSO_3H)$" read —$(CH_2=CHSO_3H)$—; column 9, line 21, and column 10, line 45, for "propanesulfate", each occurrence, read —propanesulfonate—.

Signed and sealed this 23rd day of September 1958.

[SEAL]

Attest:
KARL H. AXLINE,
*Attesting Officer.*

ROBERT C. WATSON,
*Commissioner of Patents.*